United States Patent
Boiret et al.

[11] Patent Number: 5,397,196
[45] Date of Patent: Mar. 14, 1995

[54] CONNECTOR SYSTEM

[75] Inventors: Gérard Boiret, Ivre l'Eveque; Thierry Quillet, Saint Pavace le Mans, both of France

[73] Assignee: Framatome Connectors International, Paris La Defense, France

[21] Appl. No.: 92,487

[22] Filed: Jul. 16, 1993

[30] Foreign Application Priority Data

Jul. 24, 1992 [FR] France ................ 92 09158

[51] Int. Cl.[6] .................. B25G 3/00; F16D 1/00
[52] U.S. Cl. ................... 403/348; 403/349; 285/360; 285/361; 285/376; 285/396; 285/401; 285/402
[58] Field of Search .............. 403/348, 349; 285/360, 285/361, 376, 377, 396, 401, 402

[56] References Cited

U.S. PATENT DOCUMENTS

| | | | |
|---|---|---|---|
| 941,990 | 11/1909 | Hickey | 285/361 |
| 2,198,905 | 4/1940 | Content | 285/361 |
| 3,869,218 | 3/1975 | Stoeber et al. | 403/349 |
| 4,305,180 | 12/1981 | Schwartz | 403/349 |
| 4,313,649 | 2/1982 | Morikawa et al. | 285/396 |
| 4,487,469 | 12/1984 | Bjork | 403/349 |
| 4,708,370 | 11/1987 | Todd | 285/361 |
| 5,186,197 | 2/1993 | Lavine | 403/349 |

*Primary Examiner*—Richard A. Bertsch
*Assistant Examiner*—Howard R. Richman
*Attorney, Agent, or Firm*—Pollock, Vande Sande & Priddy

[57] ABSTRACT

A connector system comprises a socket having at least one locking pin and a plug comprising a plug body and a locking ring having at least one slot along which the pin can move and an elastic member disposed at one end of the slot defining a first area in which the slot tapers and a second area in which the pin is selectively lodged. The aforementioned one end of the slot terminates at an abutment. The second area is wider than the pin and the first area so that the elastic member is retracted elastically when the pin enters the first area and returns to its initial position without being compressed by the pin when the pin is in the second area near the abutment. The elastic member of the connector system is a cantilever beam having a notch at its free end.

7 Claims, 3 Drawing Sheets

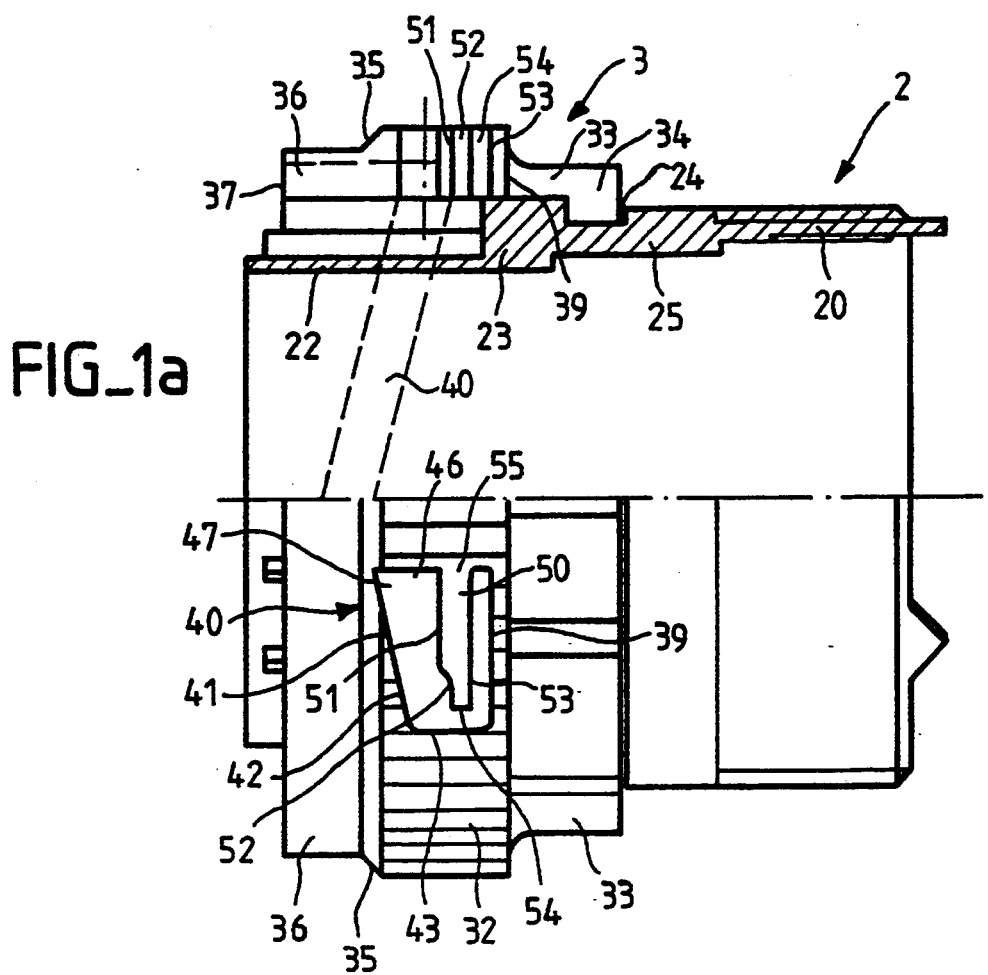
FIG_1a
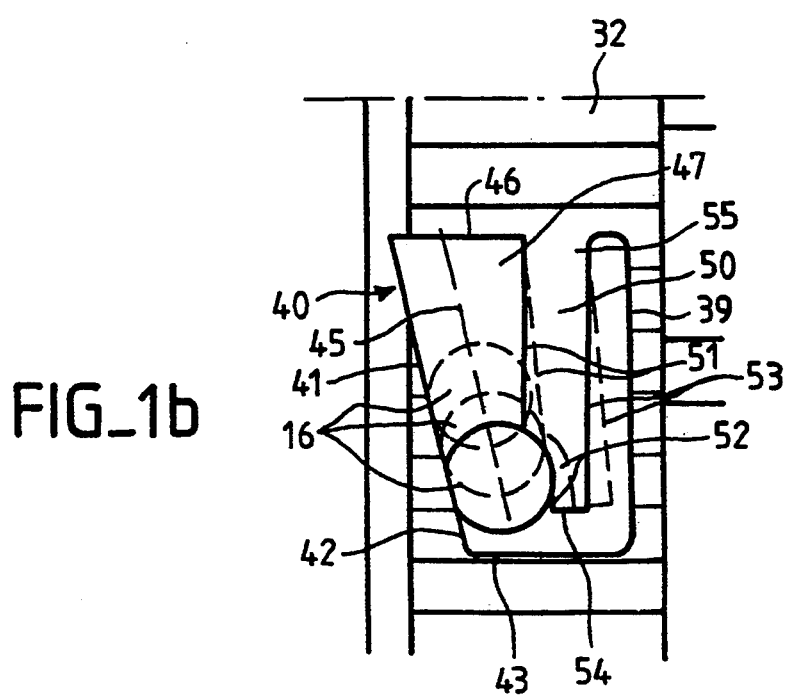
FIG_1b

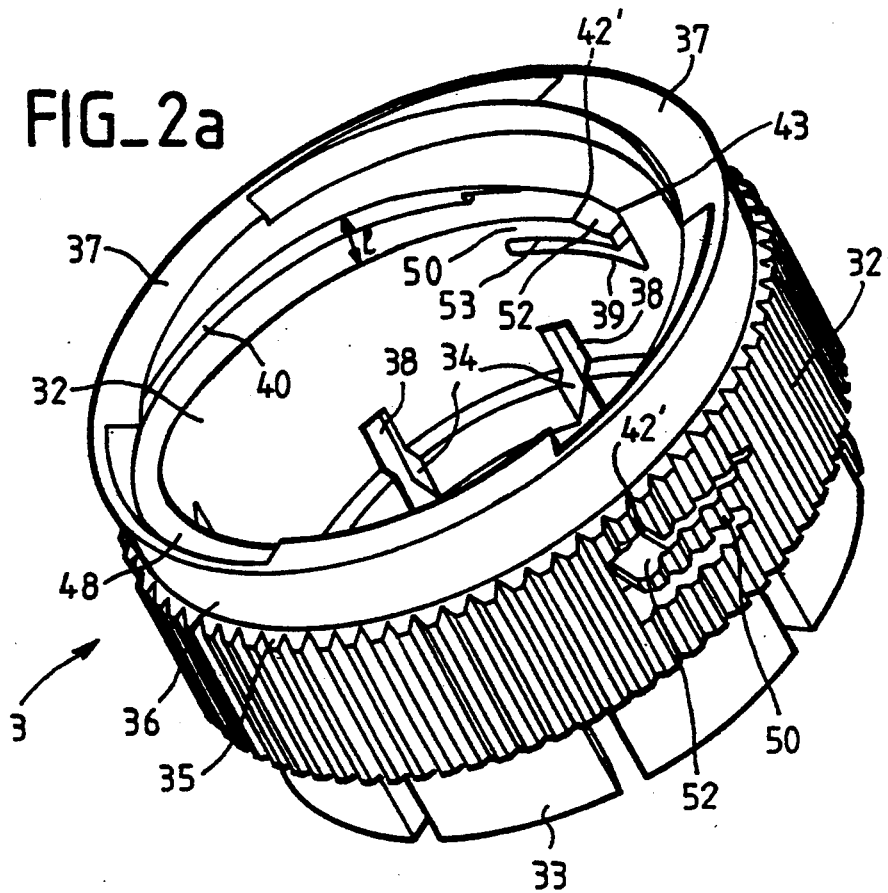
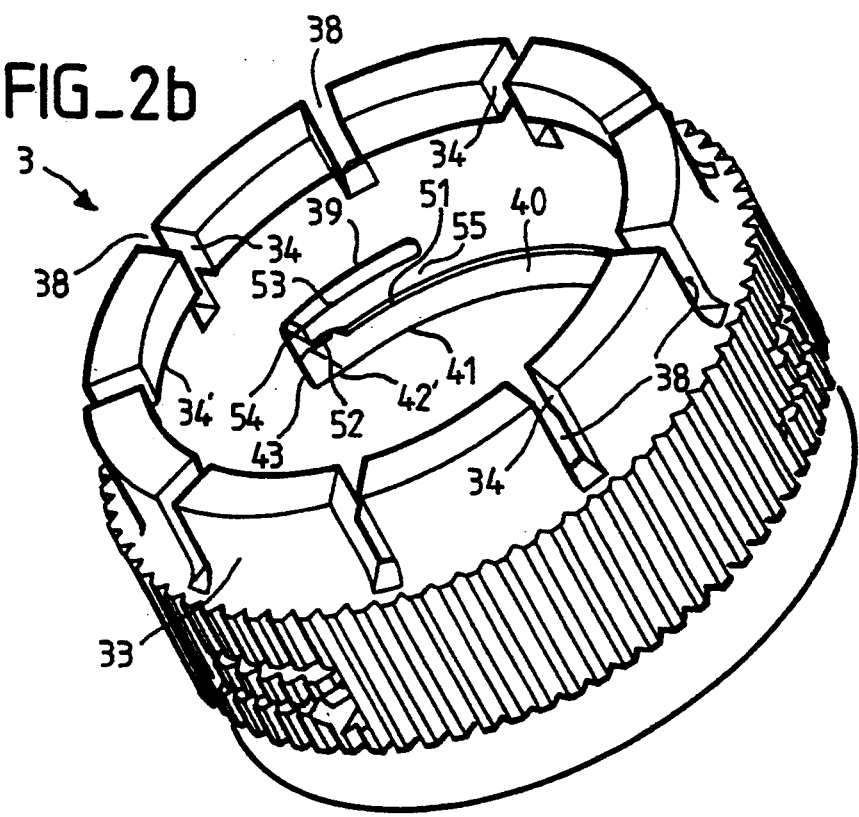

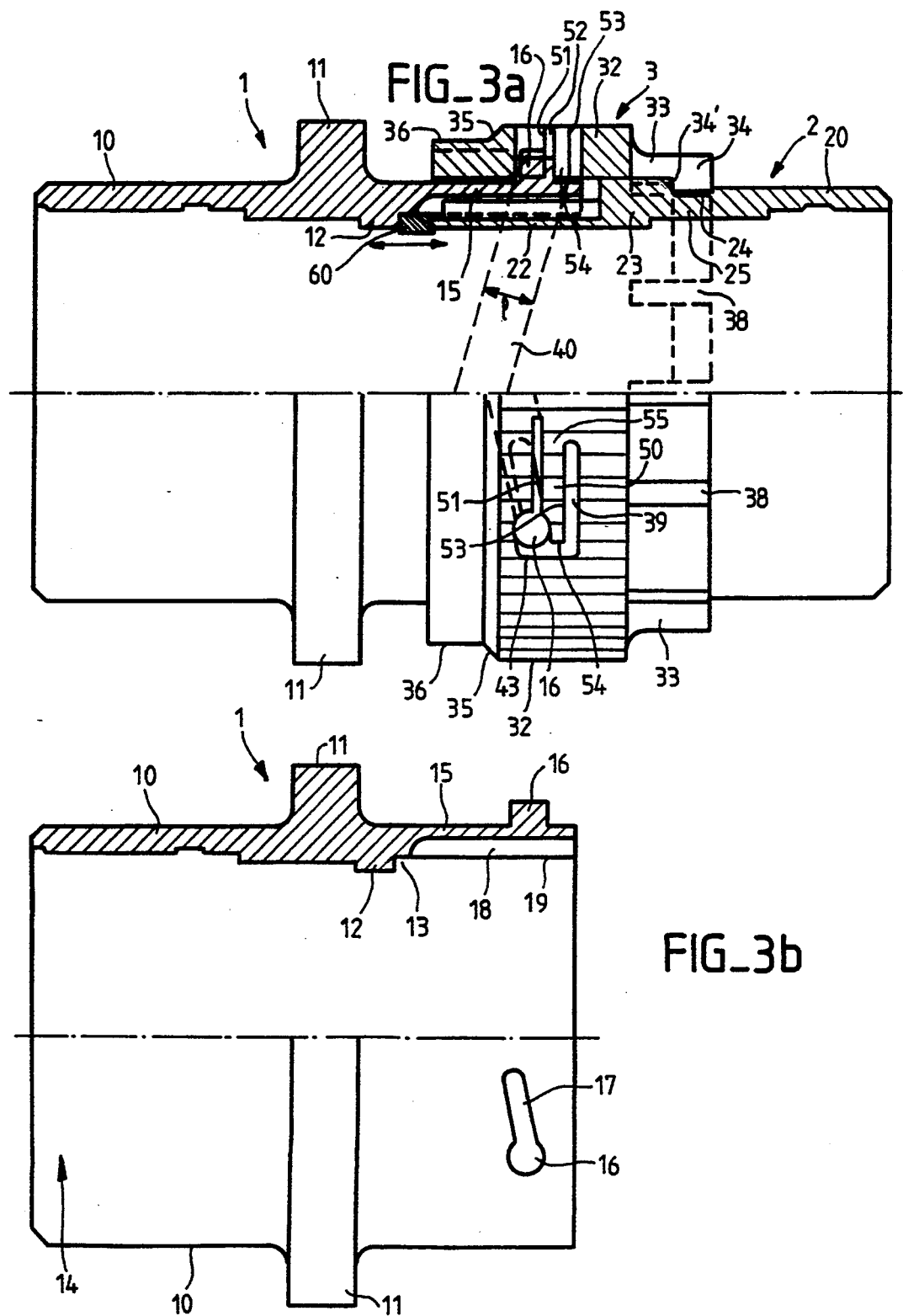

CONNECTOR SYSTEM

BACKGROUND OF THE INVENTION

1. Field of the Invention

The present invention concerns a connector system with a bayonet type locking arrangement, i.e., comprising a socket having at least one locking pin and a plug comprising a plug body and a locking ring.

2. Description of the Prior Art

Prior art connector systems of the above type are regarded as locked when the locking pin reaches an abutment. As a result, and strictly speaking, there is no specific system locking function.

The present invention concerns a connector system of the above type with positive snap-fastener locking during which there is a tactile sensation of locking force and where unlocking entails overcoming a retaining force.

SUMMARY OF THE INVENTION

In a first aspect the invention consists in a connector system comprising a socket having at least one locking pin and a plug comprising a plug body and a locking ring having at least one slot along which the pin can move and an elastic member disposed at one end of the slot defining a first area in which the slot tapers and a second area in which the pin is selectively lodged, in which system the one end of the slot terminates at an abutment and the second area is wider than the pin and the first area so that the elastic member is retracted elastically when the pin enters the first area and returns to its initial position without being compressed by the pin when the pin is in the second area near said abutment.

The socket may have three pins spaced by 120° on its outside, for example.

The spring member is advantageously a cantilever beam having a notch at its free end to form the second area. The beam may be aligned with the slot, which may be helical.

The ring advantageously has a flange free to rotate in a groove on the plug body.

In a preferred embodiment of the invention the connector system comprises an elastic seal disposed between the plug body and the socket so that when the pin is near the abutment, the seal is compressed and exerts a force tending to separate the plug body from the socket, which force is transmitted by the locking ring so that the pin is pressed against a part of the slot in the second area and adjacent the abutment so as to take up play and to relieve the elastic member of significant permanent stress loads.

In a second aspect, the invention consists in a locking ring for a bayonet type locking connector comprising at least one locking pin and having at least one slot along which the pin can move and an elastic member disposed at one end of the slot defining a first area in which the slot tapers and a second area in which the pin is selectively lodged, in which ring the one end of the slot terminates at an abutment and the second area is wider than the pin and the first area, so that the elastic member is retracted elastically as the pin enters the first area and returns to an initial position without being compressed by the pin when the pin is in the second area near the abutment. The elastic member may comprise a cantilever beam having a notch at its free end to form the second area. The beam may advantageously be aligned with the slot.

BRIEF DESCRIPTION OF THE DRAWINGS

Other features and advantages of the invention will be better understood from the following description given by way of example with reference to the appended drawings.

FIGS. 1a and 1b are views in partial longitudinal cross-section of a system in accordance with the invention comprising a plug body and a ring, FIG. 1b repeating part of FIG. 1a and showing in dashed outline the position of a beam deflected by a respective pin.

FIGS. 2a and 2b are respectively front and rear perspective views of a ring in a preferred embodiment of the invention.

FIG. 3a shows a connector system in accordance with the invention in assembled form.

FIG. 3b shows a socket for a connector system in accordance with the invention.

DETAILED DESCRIPTION

A plug in accordance with the invention comprises a plug body 2 which has a cylindrical plug part 22, a central part 23 having a peripheral groove 24 on its outside, and a rear part 20. Its locking ring 3 has a front part 36 merging through a frustoconical profile 35 with a central part 32 whose outside is formed with longitudinal corrugations to confer upon it the roughness needed for easy manipulation by the fingers of the user to lock the connector system, and a rear part 33 which has on its inside a flange 34 inserted into the peripheral groove 24 to enable free rotation of the ring about a longitudinal axis of the plug body 2. The rear part 33 has nine longitudinal slots 38 which divide the flange 34 into the same number of sectors which can move apart elastically to enable them to be mounted in the groove 24. The inner part of the ring 3 comprises helical slots 40 which start at 48 at the forward end 37 of the front part 36 and which extend as far as an abutment 43.

The socket 1 has a rear part 10 in which are disposed an insulative body and connection members 14, a flange 11 for fixing the socket to a support, an inner flange 12 having a housing 13 forming an abutment for a seal 60 and polarizer grooves 18 distributed around its front part 15, which has on its outside pins 16 which may be of metal and attached in any known manner, or which may be molded and strengthened by a generally parallelepiped-shape extension 17, for example. The diameter of a pin 16 is substantially less than the width 1 of the corresponding slot 40 to enable it to move along the latter. The drawing shows three pins spaced equi-angularly at 120° around the front part 15 of the socket 1.

As it approaches the abutment 43, the slot 40 opens out at 46 into a housing 47 of the central part 32. This housing contains an elastic member in the form of a cantilever beam 50 built in at one end 55 and extending to a free end 54 spaced from the abutment 43. The side of the beam 50 towards the slot 40 converges towards the facing edge 41 of the slot to form a taper whose width becomes progressively less than the diameter of the pin 16. Near its free end 54 the beam 50 has a recess 52 constituting a housing for the pin and whose size is preferably such that, when the beam 50 is in the rest position, the distance between the recess 52 and a part of the wall 41 adjacent the abutment 43 is greater than the diameter of the pin 16.

In the rest position, the edge 53 of the beam 50 opposite the edge 51 is parallel to a wall 39 of the housing 47 and spaced from it by a distance enabling elastic movement of the beam 50. To lock the connector, the pins 16 are inserted in the slots 40 from their open end 48 and the ring 3 is rotated until the pins 16 reach the abutments at 43. When the pins 16 reach the vicinity of the housings 47, they progressively deflect the beams 50 along their edge 51, which provides a tactile sensation of increasing locking force. When they subsequently reach the area of the recesses 52 and the beams 50 return to their rest position, there is a further tactile sensation of reducing locking force. Locking proper is then obtained by abutment of the pins 16 at 43. This may be accompanied by a soft click caused by the recesses 52 striking the pins 16 as, in the course of their return movement, they move beyond the point of equilibrium. All that is required is to choose appropriately the clearance between the pin abutted at 43 and the recess 52.

To unlock the connector system, a retaining force must be overcome to displace the beam 50 elastically again. The circular arc shape of the recess 52 provides effective locking while requiring only a moderate unlocking force.

A seal 60 housed at 13 is compressed between the front part 22 of the plug body 2 and the internal flange. The sizes of the parts are such that this compression force, which tends to separate the socket 1 and the plug body 2, is transmitted via the groove 24 to the front part 34' of the flange 34 which tends to press at 42 on the pin 16 which is already abutted at 43. In this way, the beam 50 is not subjected to any static load when the connector system is locked. The ring 3 may advantageously be made from a composite material having good elastic properties.

There is claimed:

1. A connector system comprising a socket having at least one locking pin and a plug comprising a plug body and a locking ring having at least one slot along which said pin can move and an elastic member disposed at one end of said slot defining a first area in which the slot tapers and a second area in which said pin is selectively lodged, wherein said one end of said slot terminates at an abutment and said second area is wider than said pin and said first area so that said elastic member is retracted elastically when said pin enters said first area and returns to its initial position without being compressed by said pin when said pin is in said second area near said abutment, said elastic member comprising a cantilever beam having a notch at its free end to form said second area.

2. A connector system according to claim 1 wherein said socket has three pins spaced equi-angularly by 120° on its outside.

3. A connector system according to claim 1, wherein said cantilever beam has a side converging toward a facing edge of said slot.

4. A connector system according to claim 3, wherein said slot is helical.

5. A connector system according to claim 1, wherein said ring has a flange freely rotatable in a groove of said plug body.

6. A connector system according to claim 1, further comprising an elastic seal disposed between said plug body and said socket so that when said pin is near said abutment said seal is compressed and exerts a force tending to separate said plug body from said socket which is transmitted by said locking ring so that said pin is pressed against a part of said slot in said second area and adjacent said abutment so as to take up play and to relieve said elastic member of significant permanent stress loads.

7. A locking ring for a bayonet type locking connector comprising at least one locking pin and having at least one slot along which said pin can move and an elastic member disposed at one end of said slot defining a first area in which said slot tapers and a second area in which said pin is selectively lodged, said elastic member comprising a cantilever beam having a notch at its free end to form said second area, wherein said one end of said slot terminates at an abutment and said second area is wider than said pin and said first area so that said elastic member is retracted elastically as said pin enters said first area and returns to an initial position without being compressed by said pin when said pin is in said second area near said abutment, said cantilever beam having a side converging toward a facing edge of said slot.

* * * * *